May 24, 1960 R. W. PATTERSON 2,937,865
SHOCK DAMPING APPARATUS
Filed Aug. 31, 1956
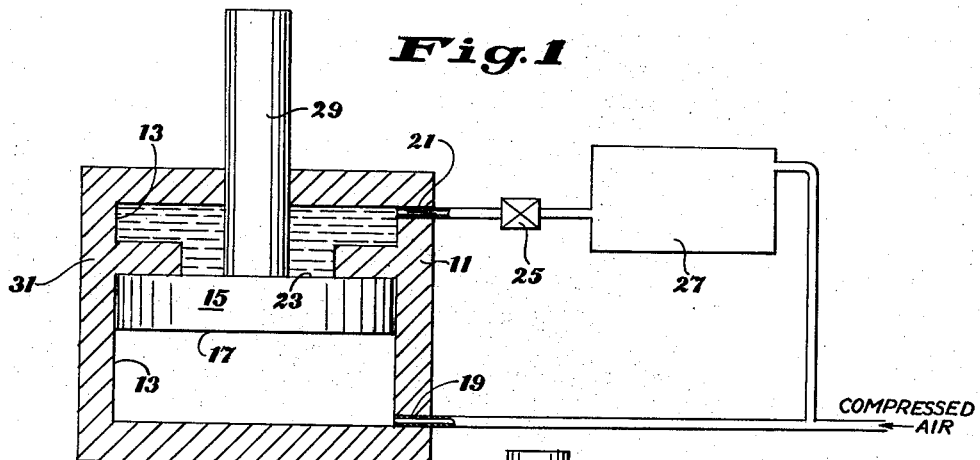
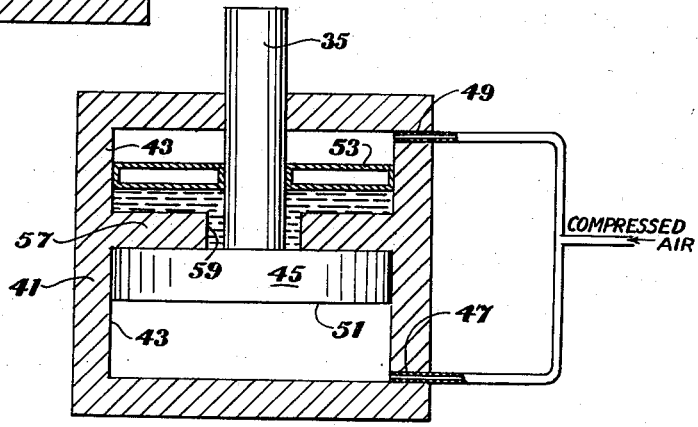
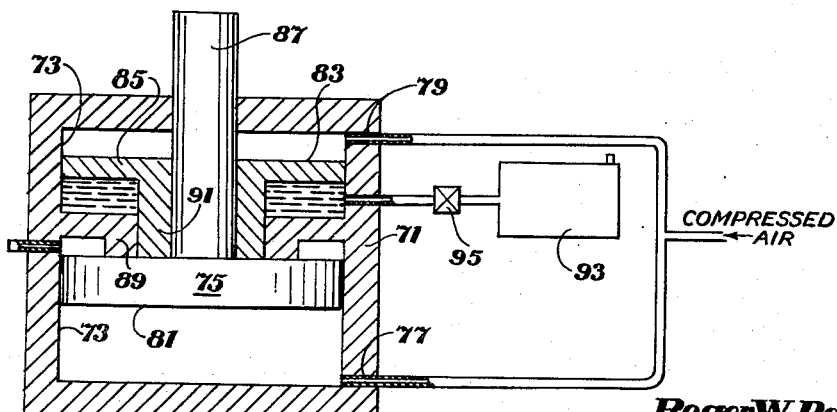
Roger W. Patterson
INVENTOR.

2,937,865
SHOCK DAMPING APPARATUS

Roger W. Patterson, New York, N.Y., assignor, by mesne assignments, to the United States of America as represented by the Secretary of the Navy Filed Aug. 31, 1956, Ser. No. 607,535

1 Claim. (Cl. 267—1)

This invention relates to a shock damping apparatus and more particularly to an apparatus which prevents repeated shocks while not distorting the wave form of the initial shock.

In shock testing certain equipment, a single shock of a specified amplitude and of a specified duration is required to be applied to the equipment. This is specifically noted with respect to the shock tests required to be made on certain equipment to be used by the military services. Heretofore shocks have been applied with damping apparatus incorporating the use of sand, springs, pneumatic cylinders, hydraulic cylinders, a hydraulic orifice, shear bars or pendulum impacts. These apparatus have not been fully satisfactory because they provided an incorrect wave form, poor repeatability, unwanted multiple shocks, nonadjustability for varying loads and shocks, or too long a set-up time between tests. The shock damping apparatus of the present invention was designed for use with a drop-type shock test machine to eliminate or substantially reduce each of these defects and comprises broadly, means for applying a balancing force to the piston of a shock cylinder at a predetermined period of time after an initially applied shock for balancing the forces on the piston and causing the piston to move at a constant velocity thereby terminating the shock.

The primary object of the present invention is, therefore, to provide a shock damping apparatus which prevents the occurrence of repeated or secondary shocks and which does not distort the wave form of the initially applied shock.

Another object of the present invention is to provide a shock damping apparatus in which means is provided for applying a balancing force to the piston of a shock cylinder at a predetermined period of time after an initially applied shock for balancing the forces on the piston and causing the piston to move at a constant velocity thereby terminating the shock.

Still other objects and advantages of the present invention will become readily apparent to those skilled in the art from the following description with reference to the drawing in which like characters denote like parts and wherein:

Fig. 1 is a view partly in section illustrating a simplified embodiment of my invention; and Fig. 2 and Fig. 3, also partly in section, are views illustrating two other embodiments of my invention.

In Fig. 1 the shock damping apparatus of my invention comprises a housing 11 provided with an internal bore 13 for receiving the piston 15 in engagement with the peripheral wall of the bore 13. Compressed air or gas is admitted to the bore 13 and against the surface 17 of the piston 15 through the aperture 19 in the housing 11. An aperture 21 longitudinally spaced from aperture 19 permits oil or other hydraulic fluid to be admitted to the housing and bear against the surface 23 of piston 15. The hydraulic fluid is forced through the valve 25 and maintained under constant pressure by the force of the compressed air on the oil in the accumulator 27.

The compressed air admitted to the housing 11 and that which acts on the hydraulic fluid in the accumulator 27 is at the same pressure and is supplied by a source, such as for example a pump (not shown). Shaft 29 is connected to piston 15 and extends from the housing 11 for receiving and transmitting the impact shocks to the piston 15 which is positioned for movement in the bore 13 within the housing 11. The annular flange 31 serves as a positioning stop for piston 15 within the bore 13.

In operation, when the equipment to be shock tested strikes the shaft 29, the resulting impact shock is transmitted to the piston 15 which is immediately accelerated in the direction of the shock impact against the force of the air under pressure on the surface 17 of the piston 15. Because the hydraulic fluid is forced through the valve 25 by the constant force of the air maintained at a predetermined constant pressure, the fluid has a substantially constant velocity after initially accelerating to that velocity and the fluid therefore loses contact with the surface 23 on the initially accelerating piston 15. After the initial shock, the piston 15 and the equipment being shock tested are decelerated at a predetermined rate against the pressure of the compressed air. After a short period of time, the constant velocity flow of hydraulic fluid catches up with and applies a constant force on the surface 23 of piston 15. The piston 15 then moves with a constant velocity and since all deceleration has ceased the equipment is no longer subjected to shock. It will be appreciated by those skilled in the art that the period of shock duration can be varied by changing the time required for the fluid to catch up with the piston 15, such as by opening or closing valve 25, by utilizing a fluid having a different viscosity, or by changing the air pressure. Changing the air pressure of the compressed air from the source will also result in a change in the shock amplitude.

Having now described the most simplified embodiment of my invention as illustrated in Fig. 1, the embodiments illustrated in Fig. 2 and Fig. 3 should be readily understood by those skilled in the art. The shock damping apparatus of Fig. 2 is quite similar to that of Fig. 1 except that the sepaarte valve 25 and accumulator 27 of Fig. 1 have been incorporated into the design of the housing. Housing 41 is provided with a bore 43 for receiving the piston 45 in engagement with the peripheral wall of the bore 43. Compressed air or gas maintained at a constant pressure and supplied by the pump, not shown, is admitted to the bore 43 through the spaced apertures 47 and 49. The compressed air acts against the surface 51 of piston 45 and also against the ring 53 which is hollow and floats on the surface of the hydraulic fluid in the bore 43. Shaft 35 is connected to the piston 45 and extends from the housing 41 for receiving and transmitting the impact shocks from the equipment to be tested to the piston 45, as was described relative to the embodiment of Fig. 1. An annular flange 57 having a restricted orifice 59 is provided in the bore 43 for regulating and maintaining a constant velocity flow of hydraulic fluid when the piston is displaced in response to the shock impact.

The operation of the embodiment illustrated in Fig. 2 is as follows: When the equipment to be shock tested strikes the shaft 35, the impact shock is transmitted to the piston 45 which is immediately accelerated against the force of the air under pressure on the surface 51 of the piston 45. Because the hydraulic fluid is forced through the restricted orifice 59 by the air under pressure acting on the fluid through the ring 53, the fluid after an initial acceleration has a substantially constant velocity and loses contact with the surface 51 of piston 45 which thereafter will begin to decelerate at a predetermined rate against the pressure of the compressed air. After a short period of time, the flow of hydraulic fluid catches up with and applies a constant force on the piston 45 which then moves with a constant velocity and since all deceleration has ceased, the equipment is no longer subjected to shock.

The shock damping apparatus of Fig. 3 comprises a housing 71 having a bore 73 for receiving the piston 75 in engagement with the peripheral wall of the bore 73. Compressed air or gas maintained at a constant pressure at the source and supplied by a pump, not shown, is admitted to the bore 73, through the spaced apertures 77 and 79. The compressed air reacts against the surface 81 of piston 75 and against the surface 83 of a second piston 85. Piston 85 also engages the peripheral wall of bore 73 and is slidably mounted around the shaft 87 which is connected to the piston 75. Shaft 87 extends from the housing 41 for receiving and transmitting impact shocks to the piston 75. An annular flange 89 is positioned within the bore 73 for slidably supporting the reduced portion 91 of the piston 85. Oil or other hydraulic fluid from the fluid reservoir 93 is contained between the piston 85 and the annular flange 89 to support the piston 85 from the piston 75. The compressed air entering aperture 77 applies a force to the surface 81 of piston 75 and the air entering aperture 79 applies a force to the surface 83 of piston 85. Movement of piston 75 against the force of the compressed air on surface 81 permits piston 85 to be moved in the same direction by the force of the compressed air on surface 83, thus forcing the hydraulic fluid through valve 95 to the reservoir 93.

The operation of the embodiment illustrated in Fig. 3 is as follows: When the equipment to be shock tested strikes the shaft 87, the impact shock is transmitted to the piston 75 which is immediately accelerated against the force of the air under pressure on surface 81 of piston 75. Because the hydraulic fluid is forced through the valve 95 by the constant force of the air maintained at a predetermined constant pressure and acting on the surface 83 of piston 85, the fluid and hence the piston 85, after an initial acceleration, have a substantially constant velocity and the piston 85 loses contact with the piston 75. After the initial shock acceleration, piston 75 and the equipment being tested are decelerated by the dampening force provided by the compressed air below surface 81 in the bore 73, which compressed air is further compressed, to provide additional dampening, by the rapid reduction in volume below surface 81 afforded by the high velocity of the piston 75 immediately after impact of the shock load. After a short period of time, the constant velocity of the piston 85 resulting from the forcing of the hydraulic fluid through the valve 95 at a constant velocity permits the piston 85 to catch up with and apply a constant force on the piston 75 which then moves with a constant velocity and since all deceleration has ceased, the equipment is no longer subjected to shock. Because the area of surface 81 is greater than the area of surface 83 by an amount equal to the cross-sectional area of shaft 87, pistons 75 and 85 upon removal of the shock-tested equipment from shaft 87 are moved to the positions shown in Fig. 3 by the air under pressure which reacts on surfaces 81 and 83. Simultaneously with the movement of pistons 75 and 85 to the positions shown in Fig. 3, the fluid which had been forced out through valve 95 to reservoir 93 flows back into the bore and again fills the space between piston 85 and flange 89.

It will now be appreciated by those skilled in the art that the shock damping apparatus of my invention prevents repeated shocks from occurring to the equipment being shock tested and which does not distort the wave form of the initial shock.

While only three embodiments of my invention are shown, other embodiments and modifications are possible and will become readily apparent to those skilled in the art from the foregoing description which is intended to be illustrative only and the scope of the invention is defined in the appended claim.

Having now particularly described my invention, what I desire to secure by Letters Patent of the United States and what I claim is:

A shock damping apparatus for use with a source of air maintained at substantially constant pressure, said apparatus comprising a housing having a longitudinal bore, a first piston mounted for longitudinal movement in said bore, a shaft connected to said first piston and extending from said housing for receiving and transmitting impact shocks to said first piston, a second piston slidably mounted on said shaft within said housing for applying a balancing force to said first piston to substantially eliminate secondary vibrations of said first piston after receiving an impact shock, means for spacing said second piston from said first piston and for transmitting said balancing force to said first piston, an annular flange formed in said bore between said first piston and said second piston, a substantially non-compressible fluid contained in said bore between said flange and said second piston, the surface of said fluid supporting said second piston in said bore, said housing having an outlet providing for the passage of said fluid from said bore, means for limiting the rate of passage of said fluid through said outlet, and means for interconnecting said air from said source and that portion of said bore between each of the pistons and the adjacent ends of said housing to apply said balancing force on said second piston and to place said fluid in said bore under pressure, whereby upon displacement of said first piston by an impact shock said second piston moves toward said first piston and applies said balancing force thereto, the rate of movement of said second piston being determined by the rate of passage of said fluid through said outlet from said bore.

References Cited in the file of this patent
UNITED STATES PATENTS

| | | |
|---|---|---|
| 706,688 | Reynders et al. | Aug. 12, 1902 |
| 1,980,423 | Messier | Nov. 13, 1934 |
| 2,260,277 | Mercier | Oct. 21, 1941 |